B. M. WALPOLE.
PROCESS OF FORMING JIGS OR FIXTURES.
APPLICATION FILED OCT. 24, 1914.
1,171,818.
Patented Feb. 15, 1916.
2 SHEETS—SHEET 1.
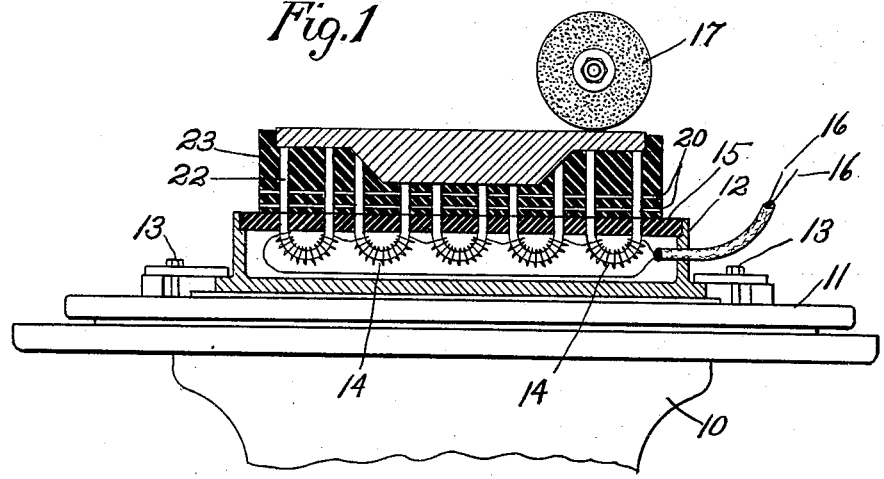
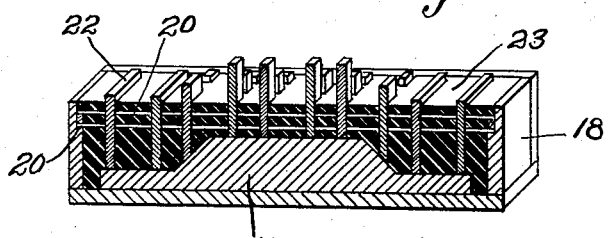
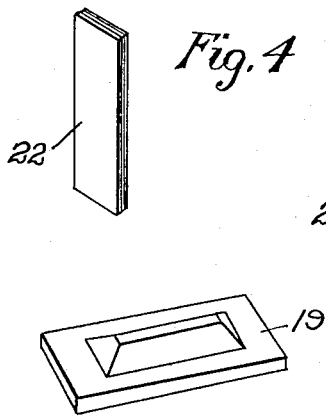
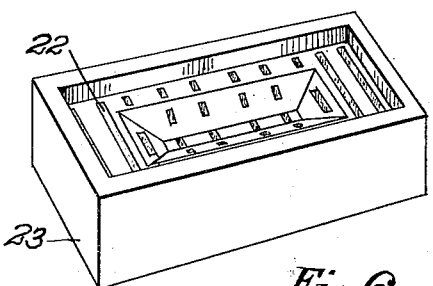
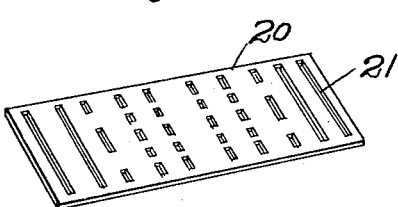
Inventor
Benjamin M. Walpole.
By Howard E. Barlow
Attorney
Witnesses
W. W. Bardsley
A. F. Macready B. M. WALPOLE.
PROCESS OF FORMING JIGS OR FIXTURES.
APPLICATION FILED OCT. 24, 1914.
1,171,818.
Patented Feb. 15, 1916.
2 SHEETS—SHEET 2.
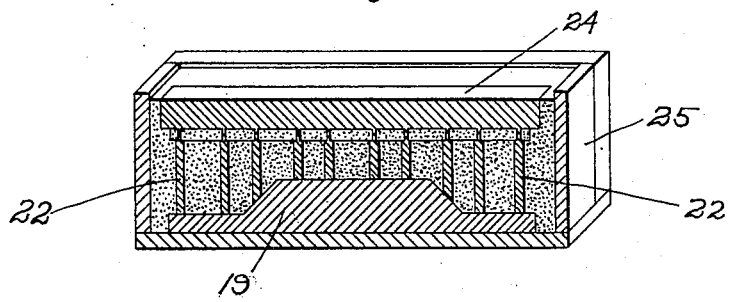
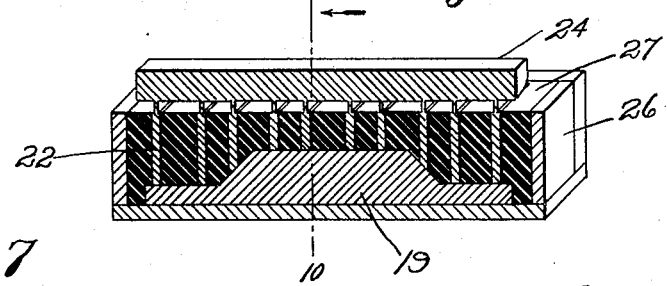
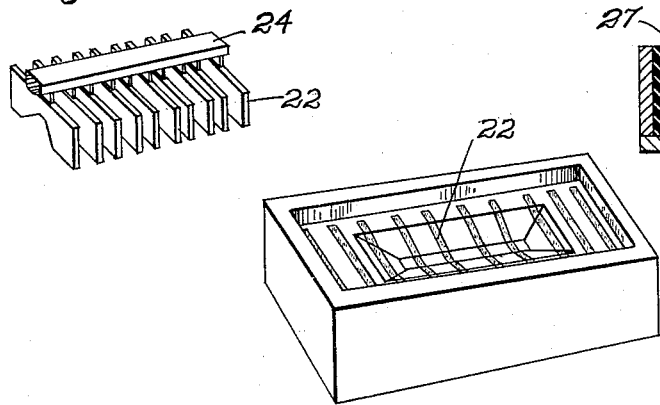
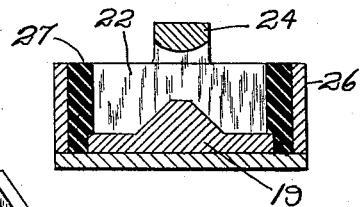
Inventor
Benjamin M. Walpole.
Witnesses
By
Attorney

UNITED STATES PATENT OFFICE.

BENJAMIN M. WALPOLE, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

PROCESS OF FORMING JIGS OR FIXTURES.

1,171,818. Specification of Letters Patent. Patented Feb. 15, 1916.

Application filed October 24, 1914. Serial No. 868,382.

*To all whom it may concern:*

Be it known that I, BENJAMIN M. WALPOLE, a citizen of the United States, and resident of Providence, in the county of Providence and State of Rhode Island, have invented certain new and useful Improvements in Processes of Forming Jigs or Fixtures, of which the following is a specification.

This invention relates to an improved method or process of forming a jig or fixture to operate in connection with a magnetic chuck, and the invention has for its object to facilitate the construction of such a jig having a holding surface that conforms to the shape or contour of that surface of the work to be engaged by it. The usual practice of forming such a jig for receiving work having an irregular or uneven surface, or a surface having one or more protuberances on the side opposite to that to be finished, is to provide a block of cast iron having slots through it, in which are loosely placed the extension pole pieces of soft iron spaced to register with the pole pieces in the chuck, these pieces are then fixed in position in these slots by calking or forcing about them some non-magnetic material, the upper surface of this block is then cut out with a profile machine, milling tool or other mechanical device to form a holding surface conforming in contour to the uneven surface of that portion of the work to be held. This method as is well understood by those skilled in the art, is a long, tedious and expensive operation. To obviate this expensive process and produce a jig or fixture having a holding surface of the desired contour, at the minimum expense, I use the work as a pattern and place the extension poles in a mold and temporarily hold them properly spaced to register with the pole pieces of the electric chuck to which the jig is to be applied, the ends of the extension pieces preferably resting against the holding surface of the work, I then apply a binding material such as molten Babbitt metal, liquid cement or other quick hardening non-magnetic material about these pieces, permanently fixing them in proper relation to each other. I then surface that portion of the jig adapted to engage the face of the chuck, and the jig is finished at the minimum expense with a holding surface perfectly formed to receive any number of pieces of work having the contour of the one used as the pattern.

With these and other objects in view, the invention consists of certain novel features of construction, as will be more fully described and particularly pointed out in the appended claims.

In the accompanying drawings: Figure 1— is a side elevation showing my improved jig in section holding the work and mounted on the magnetic chuck in position to be operated upon by the surfacing tool shown above it. Fig. 2— is a perspective view of reduced size showing the underside of a piece of work having a protuberance on its face to be held. Fig. 3— is a perspective view showing one of the gage plates employed for positioning and temporarily supporting the magnetic pole pieces. Fig. 4— is a perspective view showing one form of the extension pole pieces. Fig. 5— is a perspective view partially in section showing one form of mold in which the work is used as a pattern and into which mold the pole pieces are positioned through gage plates and a binder of non-magnetic material deposited about the pole pieces to retain them permanently with relation to each other, the outer face of this mold is subsequently surfaced whereby it is adapted to rest upon the chuck as shown in Fig. 1. Fig. 6— is a perspective view of the finished mold with the work removed therefrom showing the holding face having the contour of that portion of the work to be held. Fig. 7— is a perspective view showing the form and general arrangement of a gang of extension pole pieces tied together by a single member. Fig. 8— shows a sand mold in which this gang of pole pieces may be formed and shaped to conform to the engaging surface of the work by first forming a pattern, then casting its shape in sand. Fig. 9— is a perspective view partially in section illustrating another mold in which this gang of pole pieces are set with their ends resting upon the work after which a binder material is formed around the same to permanently fix the pieces relative to each other, the supporting member at the top being subsequently broken away when that face of the jig is surfaced or finished. Fig. 10— is a section on line 10—10 of Fig. 9 showing a sectional end view of the mold in which is shown the work and one of the extension pole pieces conforming to the shape of the work. Fig. 11— is the finished jig having its holding face shaped to conform to the contour of the work.

Referring to the drawings 10 designates a portion of the base of a grinding machine on which the bed 11 is adapted to move longitudinally on suitable ways and on this bed is mounted a magnetic chuck 12 of any suitable form, the same being secured to the bed by bolts 13. This magnetic chuck is shown as being provided with a plurality of electromagnets 14 whose pole pieces extend through the upper plate 15 of the chuck. When it is desired to operate upon work which has a flat surface, the same is simply laid upon the face of this chuck and the current turned on through the wires 16 which rigidly retain the work in position by magnetic force while it is being acted upon by the surfacing tool 17. In the majority of instances the surface of the work to be held is uneven, or irregular or has one or more protuberances extending from its under side which would prevent it from lying in proper position upon the surface of the ordinary magnetic chuck, therefore in order to support pieces of work of this character I have provided what is known as a jig or fixture for the purpose of receiving and holding pieces of work of this character and my invention lies in an improved method of forming such jigs having extension pole pieces set therein and providing the holding faces of the jig with the contour corresponding with the surface of the work to be held, and this without mechanically operating upon the surface of the jig to cut away the stock.

In carrying out my improved process I provide a mold comprising an outer casing or box 18 into which is placed the work 19 with the protuberances on its uneven or irregular surface to be held extending upward. A pair of positioning or gage plates 20 constructed of brass or other suitable non-magnetic material, is placed and spaced apart one above the other in this casing 18 and these gage plates are each provided with corresponding openings through them to receive and position the extension pole pieces 22 so that their ends will register with the poles of the magnets 14 in the chuck. It is only necessary now to drop the extension pole pieces through these openings and permit their lower ends to rest upon the surface of the work or pattern as illustrated in Fig. 5. In some cases the pole pieces 22 are made up of a series of flat plates laid up side by side to better follow the contour of the work upon coming in contact therewith. Some of these extension pieces 22 will extend farther above the mold than others according to the height of the protuberances against which they rest (see Fig. 5). In order to retain these extension pieces in permanent position relative to each other I now apply a suitable binding material such as molten Babbitt metal, plastic cement, or other suitable material which will serve as an insulator and not conduct the magnetic lines of force. After this material has solidified or hardened I remove the casing from the mold and surface off the outer face 23 of the jig. When finished this jig or fixture appears as illustrated in Fig. 6 with the holding surface formed with the contour of the engaging surface of a piece of work and any number of pieces of the same shape may be placed one after another into this jig to be operated upon by the surfacing tool 17 as illustrated in Fig. 1.

In some cases instead of temporarily supporting the extension pole pieces by the brass gage plate 20 I form these pole pieces in a gang as illustrated in Fig. 7 and tie them together by the member 24. In forming this gang of pole pieces I first place the work 19 on its face which is to be finished, then I make a wooden pattern and fit its ends representing the pole pieces, to the back surface of the work. I then ram this pattern up in the usual way in molding sand and after withdrawing the pattern, pour in molten metal of proper magnetic conductive qualities such as soft iron or the like. This gang of pole pieces thus formed is then removed from its mold 25 and is positioned in the shallower mold 26 with its pole ends resting upon the work 19. I then pour in Babbitt metal or other suitable non-magnetic material to serve as a permanent binder for supporting these extension pole pieces 22. The tie member 24 and its connections to the pole pieces are now broken off or severed and this face of the mold is then surfaced so that when the fixture is complete and set upon the magnetic chuck one end of these extension pole pieces will positively register with and engage the magnetic poles in the chuck, and their opposite ends will come into direct contact with the surface of the work whatever its contour, all by a molding process and without the necessity of machining the work engaging surface of the jig.

It is evident from the above that whether the pole pieces are formed separately and temporarily supported by gage plates, or whether these pole pieces are cast in a gang and temporarily supported by a tying member, the desired result is obtained and the cost of producing a jig or fixture of my improved construction having a holding surface of the contour of the work is reduced to the very minimum.

I claim:

1. An improved process of constructing a jig or fixture for an electric chuck which consists in positioning extension pole pieces in the mold, the work being used as a pattern and the ends of said pieces being brought into contact therewith while in the process of setting, and then depositing a binder of non-magnetic material about these pieces to permanently retain them in proper relation to each other.

2. An improved process of constructing a jig or fixture for an electric chuck which consists in placing extension pole pieces in a mold spaced apart to register with the pole pieces in the chuck, the work being used as a pattern and the contacting ends of said pieces being positioned to conform to the contour of the surface of the work, said pole pieces being temporarily held in spaced apart relation, and applying a non-magnetic binding material about these pieces to permanently bind them in fixed relation to each other.

3. An improved process of constructing a jig or fixture for electric chucks which consists in placing extension pole pieces in a mold spaced to register with the pole pieces in the chuck, the work being used as a pattern and the ends of said pieces being brought into contact therewith in setting, said pieces being temporarily supported in proper spaced apart relation, and applying a fluid binder which subsequently solidifies and hardens to support and retain said pieces in permanent relative position, thus producing a holding face conforming to the contour of the work, and subsequently surfacing that portion of the jig adapted to engage the chuck.

4. An improved process of constructing a jig or fixture for electric chucks which consists in casting or molding a plurality of spaced apart pole pieces spaced to register with the pole pieces in the chuck to which the fixture is to be applied, the ends of said pieces being positioned to contact with and conformed to the contour of that surface of the work to be held, said pole pieces being cast in a unit and supported in spaced apart relation by a tying member, and depositing a non-magnetic binding material around the pole pieces to retain them in permanent relation to each other thus producing a holding face conforming to the contour of the work and subsequently surfacing that portion adapted to engage the chuck.

In testimony whereof I affix my signature in presence of two witnesses.

BENJAMIN M. WALPOLE.

Witnesses:
HOWARD E. BARLOW,
A. F. MACREADY.

Copies of this patent may be obtained for five cents each, by addressing the "Commissioner of Patents, Washington, D. C."